July 11, 1961

T. WOLF 2,991,812

ARTICLE LOCATING DEVICE

Filed June 3, 1957

INVENTOR.
TOBIN WOLF.

BY
*[signature]*
ATTORNEY

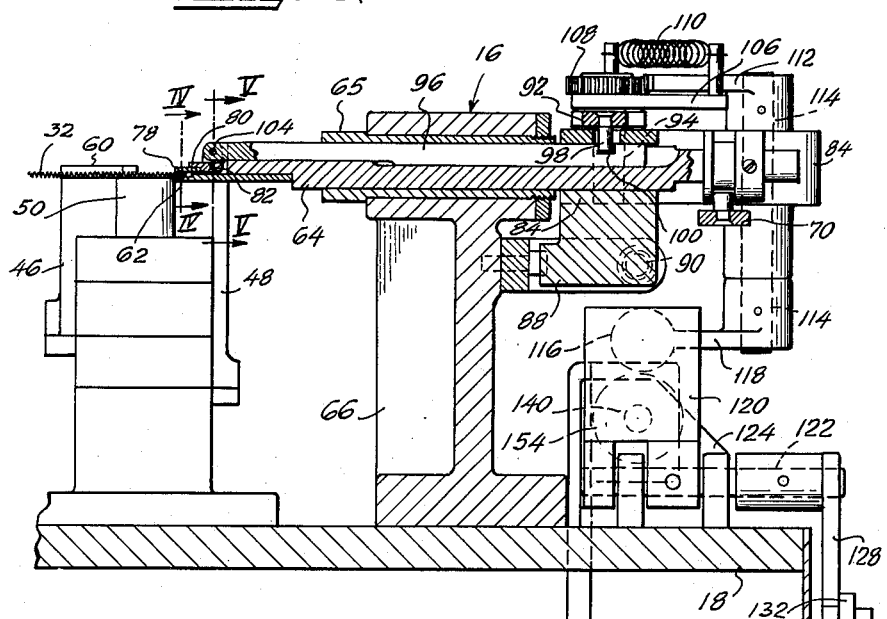

July 11, 1961
T. WOLF
2,991,812
ARTICLE LOCATING DEVICE
Filed June 3, 1957
3 Sheets-Sheet 3
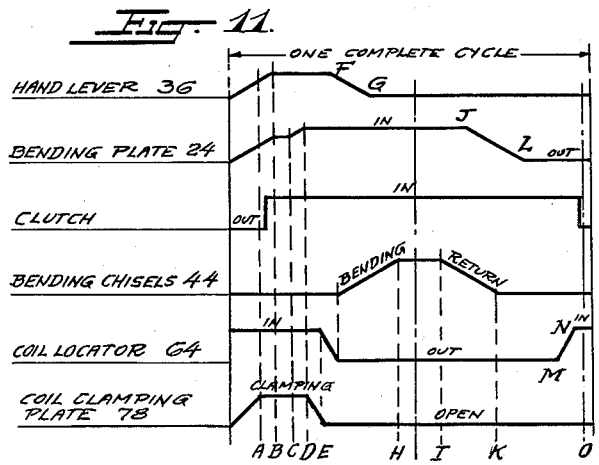
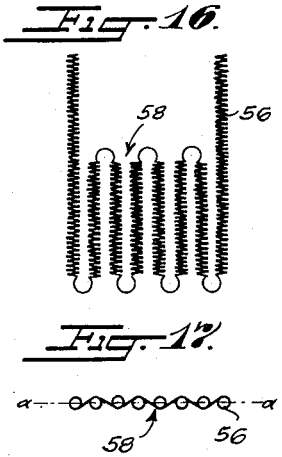
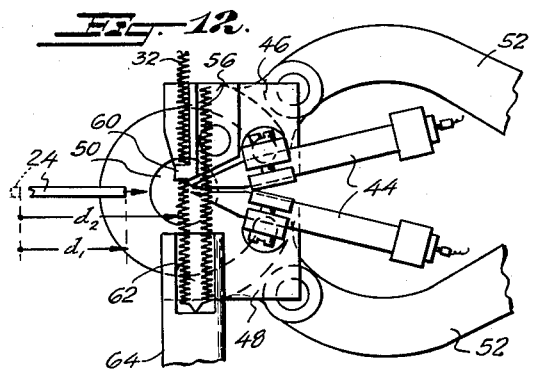
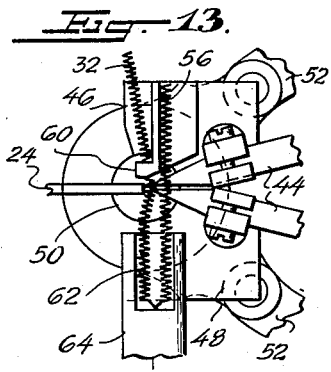
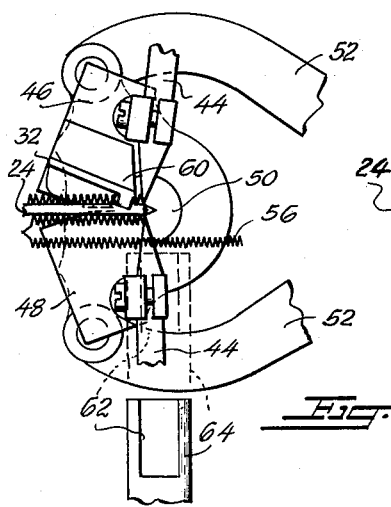
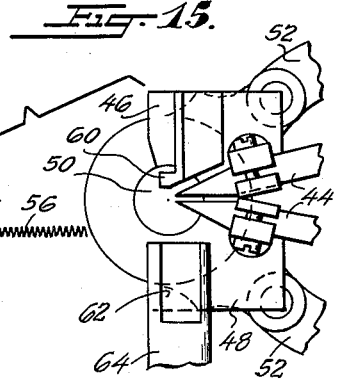
INVENTOR.
TOBIN WOLF.
BY
ATTORNEY.

United States Patent Office 2,991,812
Patented July 11, 1961

2,991,812
ARTICLE LOCATING DEVICE
Tobin Wolf, Bloomfield, N.J., assignor to Westinghouse Electric Corporation, East Pittsburgh, Pa., a corporation of Pennsylvania
Filed June 3, 1957, Ser. No. 663,069
6 Claims. (Cl. 140—71.5)

The present invention relates to coil-bending machines and, more particularly, to a coil-locating device for such a machine.

The objective in the design of projection lamps is to fill the aperture of a projection system with a light source of high brightness and maximum uniformity. This objective is accomplished by arranging the filament coils in a single or double vertical plane, accurately located with respect to the optical system by a prefocused base. The bi-plane filament, with coils arranged in two parallel rows so placed that the coils in one row fill the spaces between those of the other, has much greater uniformity and higher average brightness than the single-row monoplane filament. However, where decreased cost is an important factor and in slide projector applications where it is desirous to spread the light over relatively large areas through the use of a tilted spherical mirror to thus produce greater efficiency, the monoplane filament is generally employed.

The monoplane filament for a conventional electric projection lamp is generally formed from a continuous coil into a multi-section filament, having for example six sections, by a coil-bending machine of the type shown in U.S. Patent No. 2,686,539, issued August 17, 1954 to A. Greiner et al.

The first and last sections are bent longer than the intermediate or inner sections, so that a secondary right-angle bend may be made therein to provide filament-mounting legs. These secondary bends are made at a predetermined point in the first and last sections, which point is in the same relative location as the bending point in the center sections, to ultimately form the filament leg portions perpendicular to the parallel center sections of the filament.

Heretofore, the two last-formed sections of the coil were manually inserted into a rectangular slot under a Lucite window in the coil stop and locator of the above-mentioned U.S. Patent No. 2,686,539, which slot is for the purpose of locating the inserted sections in a desired position so that the next bend will be at a predetermined turn. The manual insertion of the formed sections into the slot requires that the slot be large enough for rapid easy loading and capable of accommodating coils of maximum tolerance. Hence, particularly in the case of minimum tolerance coils, the required clearance between the slot and the formed sections permits the latter to lie in a plane inclined from the desired horizontal plane, thereby resulting in the undesirable forming of adjacent sections of the coil which are slightly bi-plane in shape.

It is the general object of the invention to avoid and overcome the foregoing and other difficulties of and objections to prior art practices by the provision of an automatic coil-locating device for a coil-bending machine which device accommodates coils of varying tolerance, permits rapid facile insertion of the last-formed sections of the coil therein and holds the latter in a desired plane to permit the forming of the next section in the same desired plane.

A further object of the present invention is the provision of an automatic coil-locating device which is readily operated by the existing drive mechanism for the coil-bending machine without alteration to such drive.

The aforesaid objects of the invention, and other objects which will become apparent as the description proceeds, are achieved by providing a coil-locating device for a coil-bending machine comprising a coil locator which is operable to move into a coil-receiving position to permit the insertion of the last-formed sections of the coil therein and a coil-clamping plate on said coil-locator and operable to clamp the inserted located sections of the coil in a desired plane. After the insertion of the bending chisels, the coil-clamping plate releases the located coil and the coil-locator retracts to permit the swinging of the chisels to form the next section of the coil in the desired plane.

For a better understanding of the invention reference should be had to the accompanying drawings wherein the numerals of reference indicate similar parts throughout the several views and wherein:

FIG. 3 is a vertical-sectional view of the coil-bending machine and coil-locating device along the line III—III of FIG. 1 in the direction of the arrows and showing the coil-locating device in the closed or "coil-clamping" position about the last-formed sections of a coil.

FIG. 4 is an enlarged vertical-sectional view of a coil-locator slot in the coil locator and the coil-clamping plate of the coil-locating device along the line IV—IV of FIG. 3 in the direction of the arrows and showing a lever and operating slide associated with the coil-clamping plate.

FIG. 5 is a view similar to FIG. 4 along the line V—V of FIG. 3 in the direction of the arrows and showing the details of the pivotable mounting of the coil-clamping plate.

FIG. 6 is a vertical-sectional view of the coil-locator, coil-clamping plate and associated parts along the line VI—VI of FIG. 4 in the direction of the arrows.

FIG. 7 is a plan view of the coil-locator, coil-clamping plate and associated parts shown in FIG. 6.

FIG. 8 is a view similar to FIG. 6 and showing the coil-clamping plate in the "open" or "coil-inserting" position.

FIG. 9 is an enlarged vertical-sectional view of the coil-locator and coil-clamping plate in the "coil-clamping" position along the line IX—IX of FIG. 6 in the direction of the arrows and showing the last-formed sections of the coil aligned in the desired horizontal plane.

FIG. 10 is a view similar to FIG. 9 of a conventional coil-locating device and showing the sections tilted from the desired horizontal plane.

FIG. 11 is a diagrammatic view showing the operation of the coil-bending machine and the coil-locating device.

FIG. 12 is a fragmentary plan view showing the last formed sections of the coil in the coil-locating device, the bending chisels in the normal rest position and the bending blade moving inwardly toward the located coil and the bending chisels.

FIG. 13 is a view similar to FIG. 12 and showing the bending blade inserted into the coil to secure a predetermined turn of the coil between the bending blade and the bending chisels preparatory for the release of the located coil and retraction of the coil-locator.

FIG. 14 is a view similar to FIGS. 12 and 13 and indicating the retraction of the coil-locating device prior to the bending of the next section and showing the bending chisels after the completion of their swinging movement and the bending of the next section of the coil.

FIG. 15 is a view similar to FIGS. 12 through 14 showing the retraction of the bending blade and the now bent coil and the return of the bending chisels and the coil-locating device to their normal rest position preparatory to the next bending operation.

FIG. 16 is a side elevational view of a monoplane projection-lamp filament formed by the coil-bending machine with the aid of the coil-locating device of the invention.

FIG. 17 is a plan view of the filament shown in FIG. 16 and showing the formed sections of the filament aligned in the desired single plane.

Although the principles of the invention are broadly applicable to the locating of articles preparatory to the performance of a work function thereon, the invention is particularly adapted for use with a coil-bending machine and hence has been so illustrated and will be so described.

Figure 1:
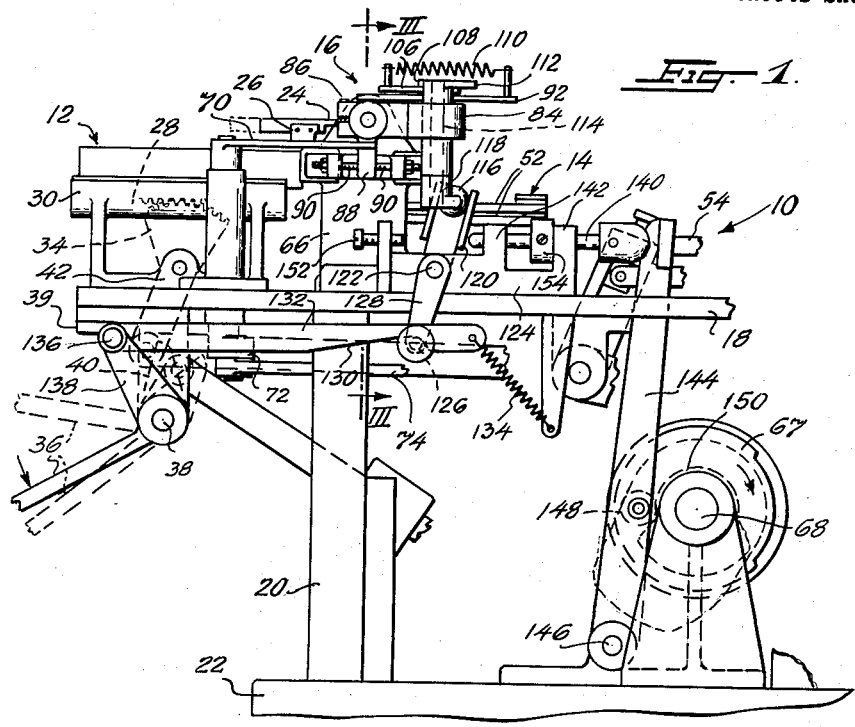
FIG. 1 is a side elevational view of a coil-bending machine wherein the coil-locating device of the invention is incorporated.
Figure 2:
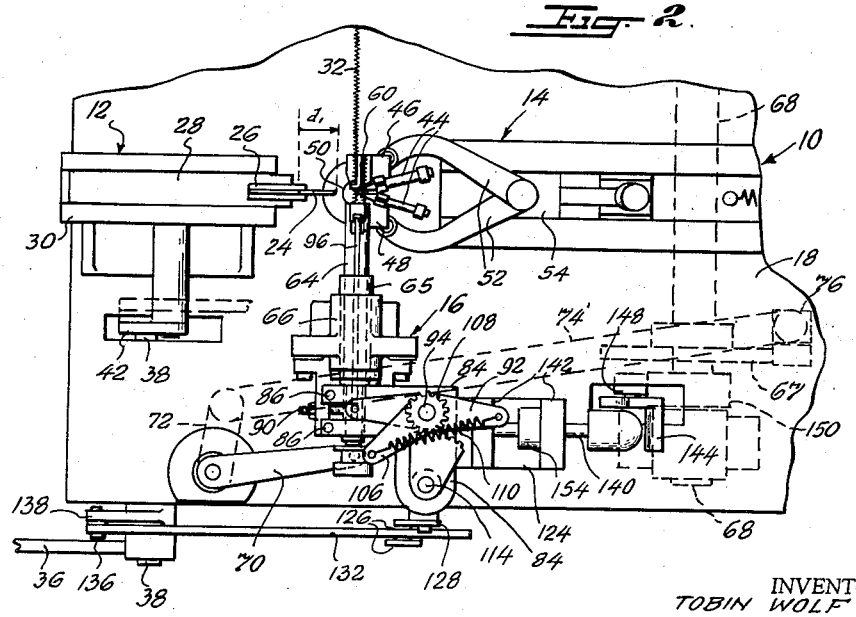
FIG. 2 is a plan view of a portion of the coil-bending machine of the coil-locating device, as shown in FIG. 1.

With specific reference to the form of the invention illustrated in the drawings, and particularly FIGS. 1–3, a coil-bending machine of the type described in the above mentioned U.S. Patent No. 2,686,539 is indicated by the reference numeral 10. While various means may be utilized to mount a conventional bending-blade mechanism 12 and bending-chisel mechanism 14 as well as the improved coil-locator device 16 of the invention, the form of the invention illustrated in the accompanying drawings employs a frame comprising a platform 18 supported by legs 20 upstanding from a base 22.

Since the bending-blade mechanism 12 and the bending-chisel mechanism 14 are conventional, and are fully described in the above-mentioned U.S. Patent No. 2,686,539, and per se form no part of this invention, it is deemed sufficient to briefly describe their structure and operation. The bending-blade mechanism 12 (FIGS. 1, 2 and 12–15) has a bending blade 24 mounted by means of a holder 26 on a rack 28 slidable in a bracket 30 on the platform 18. To move the bending blade 24 toward and into contact with a continuous coil 32 supported on the bending-chisel mechanism 14 and properly located in a desired position and plane by the coil-locating device of the invention, as hereinafter explained in greater detail, a clockwise movement, as viewed in FIG. 1, is imparted to a segment 34 meshing with the rack 28 by counterclockwise movement of a hand lever 36 on a shaft 38 journalled in brackets 39 from the upper dotted line position of FIG. 1, to the solid line position shown therein and through conventional linkage comprising a trip arm 40 on the shaft 38 and an operating arm 42. Conversely, clockwise movement of the hand lever 36 moves the bending blade 24 away from the coil 32.

The bending-chisel mechanism 14 has a pair of bending chisels 44 (FIGS. 2, 12–15) mounted on hinged elements 46 and 48 rotatable on a center post 50. In order to swing the bending chisels 44 from the position shown in FIG. 12 to the position shown in FIG. 14, and thereby form a section in the coil 32, a pair of links 52, commonly pivoted on a slide 54 and connected to the elements 46 and 48, are moved from right to left, as viewed in FIG. 2, by an operating mechanism for the bending chisels shown and described in detail in the above mentioned U.S. Patent No. 2,686,539.

Assuming, for example, that a first bend or loop has been made by the coil-bending machine 10 to provide a first or leg section 56 for a filament 58 (FIGS. 16 and 17), the now sectioned coil 32 is slipped along the elements 46 and 48 and post 50 under a locating guide 60 (FIG. 12) on the hinged element 48 and into a locating slot 62 provided in a coil locator 64, which has been moved from the solid line position of FIG. 14 to the solid line position of FIG. 12 by an operating mechanism for the coil locator 64. As shown in FIGS. 4 and 9, the depth of the coil-locating slot 62 in the plate-like forward portion of the coil locator 64 is less than the diameter of the sections of the coil 32 and the main portion of the coil locator 64 (FIGS. 4 and 5) is a round rod.

Since the operating mechanism for the coil locator 64 (FIGS. 1–3) is conventional, it is deemed sufficient to say that the coil locator 64 is reciprocable in a bearing 65 affixed to a bracket 66 on the platform 18 by a cam 67 on the main cam shaft 68 of the coil-bending machine 10 through conventional linkage, such as an upper arm 70 (FIGS. 1 and 2), lower arm 72, connecting rod 74 and a lever 76 provided with a cam follower (not shown).

After insertion of the now sectioned coil 32 in the coil-locating slot 62, the operator moves the hand lever 36 counterclockwise from the upper dotted-line position of FIG. 1 to the solid-line position shown therein, thereby moving the bending blade 24 toward the located coil 32 and causing counterclockwise movement of a transparent coil-clamping plate 78, as viewed in FIGS. 3, 6, 7 and 8 affixed to a lever 80 pivoted at 82 on the coil locator 64, toward the located coil 32. This movement of the hand lever 36 is transmitted by a connecting mechanism, as hereinafter described, to the coil-clamping plate 78 to move it from the position shown in FIG. 8 to the positions shown in FIGS. 6 and 9, to thereby clamp the located sections of the coil 32 in a desired horizontal plane along the line a—a of FIG. 9 during the insertion of the bending chisels 44 into the coil 32. This positive clamping of the coil 32 by the coil clamping plate 78 prevents undesirable alignment of the sections of the coil 32 in a plane through a line a—a of FIG. 10, as experienced with a conventional coil-locator device 78a.

Connecting mechanism

To provide support means for the moving parts of the connecting mechanism, a mounting plate 84 (FIGS. 1–3) is affixed by means of a split collar projection thereon and bolts 86 on the outer end of the coil locator 64, as viewed in FIG. 2. For the purpose of aligning the coil-locator slot 62 in the desired horizontal plane, a depending lug 88 (FIGS. 1 and 3) of the mounting plate 84 is adjustably positioned by a pair of bolts 90, carried by lateral extensions of the bracket 66.

The structure for rotating the coil-clamping plate 78 counterclockwise, as viewed in FIGS. 3, 6 and 8, to clamp the located coil 32, comprises a straight lever 92 (FIGS. 1–3) rotatable by snap action on a shaft 94 journalled in the mount-plate 84 and connected transversely on "dead center" to a slide 96 by a pin 98 (FIG. 3) depending into a slot 100 in the slide 96 which slide is reciprocable in a suitable U-shaped longitudinal slot 102 in the coil locator 64 and is connected by a pin 104 to the lever 80. In order to provide operating means for moving the lever 92 clockwise (FIG. 2) beyond "dead center" and causing the coil-clamping plate 78 to move in counterclockwise direction, as viewed in FIGS. 3, 6 and 8 to clamp the located coil 32 in the coil-locator slot 62, a lever 106 (FIGS. 1–3) on the shaft 94 and carrying a gear 108 is connected by a snap-spring 110 to the lever 92 and such lever 106 is moved in counterclockwise direction, as viewed in FIG. 2, by a segment 112 mounted on a shaft 114 in the mounting plate 84 and meshing with the gear 108. To rotate the shaft 114 and a segment 112 in clockwise direction, as viewed in FIG. 2, to achieve the desired closing of the coil-clamping plate 78, a ball 116 (FIG. 3) on the end of an arm 118 projecting laterally from the lower portions of the shaft 114 is contained between the vertical bifurcations of a yoke 120 affixed to a horizontal shaft 122 journalled in a bracket 124 on the platform 18 and oscillatable in a vertical plane, as viewed in FIG. 1. For the purpose of rotating the yoke 120 in clockwise direction to cause closing of the coil-clamping plate 78, a headed bolt 126, on an operating arm 128 secured to the shaft 122 is held in engagement with an operating slot 130 (FIG. 1) in a connecting rod 132 by means of a spring 134, which rod 132 is pivoted at 136 to an arm 138 on the shaft 38 and is movable to the left, as viewed in FIGS. 1 and 2, by counterclockwise rotation of the hand lever 36.

It will be understood from a consideration of FIG. 11 that as the hand lever 36 moves from the upper dotted-line position of FIG. 1 to the solid-line position shown therein, which latter position is achieved at a time in the operating cycle indicated in FIG. 11 by the centerline "A," the bending blade 24 has moved a distance "$d_1$" (FIGS. 2 and 12) toward the located coil 32 which coil 32 has been clamped in the coil locator slot 62 by the coil-clamping plate 78. As rotation of the hand lever 36 is continued from the solid-line position in FIG. 1 to the lower dotted-line position shown therein, such continued rotation of the shaft 38 causes a clutch (not shown) to release the main cam shaft 68 to permit rotation thereof in clockwise direction, as viewed in FIG. 1, by its driving motor (not shown). During this continued rotation of the hand lever 36, the slot 130 in the connecting rod 132 (FIG. 1) rides over the headed bolt 126 and such connecting rod 132 moves to the left. When the hand lever 36 reaches the lower dotted-line position of FIG. 1, the bending blade 24 has now moved a distance "$d_2$" (FIG. 12) and is just making contact with the located coil 32, both positions being achieved at a time indicated in FIG. 11 by the centerline "B."

During a later time in the operating cycle, indicated in FIG. 11 between the centerlines "C" and "D," a cam (not shown) on the main cam shaft 68 causes a mechanism (not shown) for finally positioning the bending blade 24 to insert the bending blade 24 into the coil 32 (FIG. 13) to secure one turn thereof, prelocated by the coil-locating device of the invention between the bending blade 24 and the bending chisels 44.

During the period of time indicated in FIG. 11 between centerlines "D" and "E" the coil-clamping plate 78 is moved in clockwise direction, as viewed in FIGS. 3, 6 and 8 from the position shown in FIG. 6 to the position shown in FIG. 8, by a releasing mechanism (FIGS. 1–3), to release the located coil 32 preparatory to the retraction of the coil locator 64, from the dotted-line position in FIG. 14 to the solid-line position shown therein, by the operating mechanism for the coil locator 64, which retraction of the locator 64 occurs between the period indicated in FIG. 11 by the centerlines "E" and "F."

*Releasing mechanism*

The releasing mechanism (FIGS. 1–3) comprises a horizontal operating rod 140 slidable in upstanding bifurcations 142 in the bracket 124, which rod 142 is movable to the left, as viewed in FIGS. 1 and 2, by a lever 144 pivoted at 146 and provided with a cam roller 148 biased by a spring (not shown) into engagement with a cam 150 on the now rotating main cam shaft 68. Such left-hand movement of the rod 140 causes the yoke 120 to rotate in counterclockwise direction in a vertical plane (FIG. 1), as limited by a stop 152 on the platform 18. To limit the movement of the rod 142 by the yoke 120 to the right, as viewed in FIGS. 1 and 2, during the above described clamping of the located coil 32 by the coil-clamping plate 78, a collar 154 fixed on the rod 142 engages the right-hand bifurcation 142.

Thus, during the period of the operating cycle, indicated in FIG. 11 by centerlines "D" and "E" a raised portion of the cam 150 causes counterclockwise rotation of the yoke 120 in a vertical plane, as viewed in FIG. 1. This rotation of the yoke 120 moves the ball 116, shaft 114 and segment 112 also in counterclockwise direction (FIG. 2) with attendant rotation of the lever 106 in clockwise direction, thus causing the snap spring 110 to rotate the straight lever 92 in counterclockwise direction through "dead center" and to cause movement of the coil-clamping plate 78 to the "open" position, shown in FIGS. 2 and 8.

After the coil locator 64 has been retracted to the solid-line position shown in FIG. 14, the operator releases the hand lever 36, which is retracted during the period in FIG. 11 by the centerlines "F" and "H," the operating mechanism for the bending chisels 44 swings them and the coil 32, held by one turn between the bending blade 24 and the bending chisels 44 from the position shown in FIG. 13 to the position shown in FIG. 14, thus forming the next or second section of the coil 32.

Thereafter, the operating mechanism for the bending chisels 44 retract the chisels during the period indicated in FIG. 11 by centerlines "I" and "K" from the position shown in FIG. 14 to the position shown in FIG. 15. During this retraction the operating mechanism for the bending blade 24 begins to retract the bending blade 24 and the now bent, sectioned coil 32 to the left from the position shown in FIG. 14 to the position shown in FIG. 15, this retraction of the bending blade 24 being accomplished during the period of the operating cycle indicated in FIG. 11 by the centerlines "J" and "L." The operator then removes the sectioned coil 32 from the bending blade 24 preparatory for the bending of the next section of the coil 32.

During the period of the operating cycle indicated in FIG. 11 by the centerlines "M" and "N," the operating mechanism for the coil locator 64 moves the coil locator from the solid-line position shown in FIG. 14 to the solid-line position shown in FIG. 15. The clutch (not shown) stops the rotation of the main cam shaft 68 at a time indicated by the centerline "O" of FIG. 11, thus preparing the coil-bending machine 10 and coil-locating device 16 of the invention for the bending of the next section of the coil 32, which operation is repeated until a filament 58 (FIG. 16) having its sections aligned in a horizontal plane along the line $a—a$, as viewed in FIG. 17, is achieved.

It will be recognized by those skilled in the art that the objects of the present invention have been achieved by providing a coil-bending machine with an automatic coil-locating device which accommodates various sizes of coils, permits the rapid insertion of the last-formed sections of the coil therein and holds the latter in a desired plane during securement of the located turn of the coil between the bending-chisels and the bending-blade to permit the forming of the next section of the coil in the same desired plane. In addition, the coil locating device is readily operated from the existing drive mechanism of the coil bending machine without alteration thereto.

While in accordance with the patent statutes one best known embodiment of the invention has been illustrated and described in detail, it is to be particularly understood that the invention is not limited thereto or thereby.

I claim:

1. In a coil-bending machine having a coil-bending mechanism for forming successive sections in a coil, a coil-locating device for locating a predetermined turn of an unsectioned portion of said coil in a desired position and for clamping said coil in a desired plane to permit the securing of said predetermined turn by said coil-bending mechanism preparatory for the bending of said next section by said coil-bending mechanism, said coil-locating device comprising a coil locator provided with a locating slot cut in a top surface of said coil locator having a length to permit the insertion of said unsectioned portion and an adjacent already formed section into said locating slot with said predetermined turn in said desired position, said locating slot having a depth which is less than the outside diameter of said coil to permit the inserted unsectioned portion and the inserted adjacent already formed section to project above said top surface of the coil locator, a coil-clamping plate carried by said coil-locator, and drive means connected to said coil-clamping plate for moving said coil-clamping plate from a coil-inserting position into engagement with said inserted unsectioned portion and said inserted adjacent already formed section thus clamping said inserted unsectioned portion and said inserted adjacent already formed section in said locating slot in said desired plane and said predetermined turn in said desired position to permit said coil-bending mechanism to secure said predetermined turn.

2. In a coil-bending machine having a coil-bending mechanism for forming successive sections in a coil, a coil-locating device for locating a predetermined turn of an unsectioned portion of said coil in a desired position and for clamping said coil in a desired plane to permit the securing of said predetermined turn by said coil-bending mechanism preparatory for the bending of said next section by said coil-bending mechanism, said coil-locating device comprising a coil locator provided with a locating slot cut in a top surface of said coil locator having a length to permit the insertion of said unsectioned portion and an adjacent already formed section into said locating slot with said predetermined turn in said desired position, said locating slot having a depth which is less than the outside diameter of said coil to permit the inserted unsectioned portion and the inserted adjacent already formed section to project above said top surface of the coil locator, a coil-clamping plate carried by said coil-locator, drive means connected to said coil-clamping plate for moving said coil-clamping plate from a coil-inserting position into engagement with said inserted unsectioned portion and said inserted adjacent already formed section thus clamping said inserted unsectioned portion and said inserted adjacent already formed section in said locating slot in said desired plane and said predetermined turn in said desired position to permit said coil-bending mechanism to secure said predetermined turn, and releasing means operatively connected to said drive means for moving said coil-clamping plate to said coil-inserting position thus releasing said inserted unsectioned portion and said inserted adjacent already formed section prior to the retraction of said coil locator.

3. In a coil-bending machine having a coil-bending mechanism for forming successive sections in a coil, a coil-locating device for locating a predetermined turn of an unsectioned portion of said coil in a desired position and for clamping said coil in a desired plane to permit the securing of said predetermined turn by said coil-bending mechanism preparatory for the bending of said next section by said coil-bending mechanism, said coil-locating device comprising a coil locator provided with a locating slot cut in a top surface of said coil locator to receive said unsectioned portion and an adjacent already formed section and having a length to permit the insertion of said unsectioned portion and said already formed section into said locating slot with said predetermined turn in said desired position, operating means connected to said coil locator for moving said coil locator from a retracted position to a coil-locating position to permit the insertion of said unsectioned portion and said adjacent already formed section into said locating slot with said predetermined turn in said desired position, said locating slot having a depth which is less than the outside diameter of said coil to permit the inserted unsectioned portion and the inserted adjacent already formed section to project above said top surface of the coil locator, a coil-clamping plate carried by said coil-locator, and drive means connected to said coil-clamping plate for moving said coil-clamping plate from a coil-inserting position into engagement with said inserted unsectioned portion and said inserted adjacent already formed section thus clamping said inserted unsectioned portion and said inserted adjacent already formed section in said locating slot in said desired plane and said predetermined turn in said desired position to permit said coil-bending mechanism to secure said predetermined turn.

4. In a coil-bending machine having a coil-bending mechanism for forming successive sections in a coil, a coil-locating device for locating a predetermined turn of an unsectioned portion of said coil in a desired position and for clamping said coil in a desired plane to permit the securing of said predetermined turn by said coil-bending mechanism preparatory for the bending of said next section by said coil-bending mechanism, said coil-locating device comprising a coil locator provided with a locating slot cut in a top surface of said coil locator having a length to receive said unsectioned portion and an adjacent already formed section with said predetermined turn in said desired position, operating means connected to said coil locator for moving said coil locator from a retracted position to a coil-locating position to permit the insertion of said unsectioned portion and said adjacent already formed section into said locating slot with said predetermined turn in said desired position, said locating slot having a depth which is less than the outside diameter of said coil to permit the inserted unsectioned portion and the inserted adjacent already formed section to project above said top surface of the coil locator, a coil-clamping plate carried by said coil-locator, drive means connected to said coil-clamping plate for moving said coil-clamping plate from a coil-inserting position into engagement with said inserted unsectioned portion and said inserted adjacent already formed section thus clamping said inserted unsectioned portion and said inserted adjacent already formed section in said locating slot in said desired plane and said predetermined turn in said desired position to permit said coil-bending mechanism to secure said predetermined turn, and releasing means operatively connected to said drive means for moving said coil-clamping plate to said coil-inserting position thus releasing said inserted unsectioned portion and said inserted adjacent already formed section prior to the retraction of said coil locator.

5. In a coil-bending machine having a coil-bending mechanism for forming successive sections in a coil, a coil-locating device for locating a predetermined turn of an unsectioned portion of said coil in a desired position and for clamping said coil in a desired plane to permit the securing of said predetermined turn by said coil-bending mechanism preparatory for the bending of said next section by said coil-bending mechanism, said coil-locating device comprising a coil locator provided with a locating slot cut in a top surface of said coil locator and having a length to receive said unsectioned portion and an adjacent already formed section with said predetermined turn in said desired position, operating means connected to said coil locator for moving said coil locator from a retracted position to a coil-locating position to permit the insertion of said unsectioned portion and said adjacent already formed section into said locating slot with said predetermined turn in said desired position, said locating slot having a depth which is less than the outside diameter of said coil to permit the inserted unsectioned portion and the inserted adjacent already formed section to project above said top surface of the coil locator, a coil-clamping plate carried by said coil-locator, drive means connected to said coil-clamping plate for moving said coil-clamping plate from a coil-inserting position into engagement with said inserted unsectioned portion and said inserted adjacent already formed section thus clamping said inserted unsectioned portion and said inserted adjacent already formed section in said locating slot in said desired plane and said predetermined turn in said desired position to permit said coil-bending mechanism to secure said predetermined turn, releasing means operatively connected to said drive means for moving said coil-clamping plate to said coil-inserted position thus releasing said inserted unsectioned portion and said inserted adjacent already formed section prior to the retraction of said coil locator, and said operating means being then operable to retract said coil locator from said coil-locating position to said retracted position after said coil-bending mechanism has secured said predetermined turn to permit the desired bending of said turn and said next section in said desired plane.

6. In a coil-bending machine having a coil-bending mechanism for forming successive sections in a coil, a coil-locating device for locating a predetermined turn of an unsectioned portion of said coil in a desired position and for clamping said coil in a desired plane to permit the securing of said predetermined turn by said coil-bending mechanism preparatory for the bending of said next section by said coil-bending mechanism, said coil-locating device comprising a coil locator provided with a locating slot cut in a top surface of said coil locator and having a length to receive said unsectioned portion and an adjacent already formed section with said predetermined turn in said desired position, operating means connected to said coil locator for moving said coil locator from a retracted position to a coil-locating position to permit the insertion of said unsectioned portion and said adjacent already formed section into said locating slot with said predetermined turn in said desired position, said locating slot having a depth which is less than the outside diameter of said coil to permit the inserted unsectioned portion and the inserted adjacent already formed section to project above said top surface of the coil locator, a transparent coil-clamping plate carried by said coil locator and adapted to permit continuous visual observation of the coil-locating operation, drive means connected to said coil-clamping plate for moving said coil-clamping plate from a coil-inserting position into engagement with said inserted unsectioned portion and said inserted adjacent already formed section thus clamping said inserted unsectioned portion and said inserted adjacent already formed section in said locating slot in said desired plane and said predetermined turn in said desired position to permit said coil-bending mechanism to secure said predetermined turn, releasing means operatively connected to said drive means for moving said coil-clamping plate to said coil-inserting position thus releasing said inserted unsectioned portion and said inserted adjacent already formed section prior to the retraction of said coil locator, and said operating means being then operable to retract said coil locator from said coil-locating position to said retracted position after said coil-bending mechanism has secured said predetermined turn to permit the desired bending of said turn and said next section in said desired plane.

References Cited in the file of this patent

UNITED STATES PATENTS

| | | |
|---|---|---|
| 2,114,844 | Krause | Apr. 19, 1938 |
| 2,334,505 | Peterson | Nov. 16, 1943 |
| 2,456,222 | Stull | Dec. 14, 1948 |
| 2,624,377 | Smith | Jan. 6, 1953 |
| 2,686,539 | Greiner et al. | Aug. 17, 1954 |